(12) United States Patent
Schulz et al.

(10) Patent No.: US 9,115,730 B2
(45) Date of Patent: Aug. 25, 2015

(54) VALVE DEVICE

(75) Inventors: Frank Schulz, Blieskastel-Bierbach (DE); Peter Bruck, Althornbach (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 314 days.

(21) Appl. No.: 13/261,374

(22) PCT Filed: Jan. 15, 2011

(86) PCT No.: PCT/EP2011/000158
§ 371 (c)(1),
(2), (4) Date: Jul. 19, 2012

(87) PCT Pub. No.: WO2011/088974
PCT Pub. Date: Jul. 28, 2011

(65) Prior Publication Data
US 2012/0285568 A1 Nov. 15, 2012

(30) Foreign Application Priority Data
Jan. 21, 2010 (DE) .......................... 10 2010 005 228

(51) Int. Cl.
*F15B 13/043* (2006.01)
*F16K 31/42* (2006.01)

(52) U.S. Cl.
CPC ........... *F15B 13/0435* (2013.01); *F16K 31/426* (2013.01); *Y10T 137/86582* (2015.04); *Y10T 137/86614* (2015.04)

(58) Field of Classification Search
CPC .................... F15B 13/0435; Y10T 137/86614; Y10T 137/86582; F16K 31/426
USPC ............. 137/625.18, 625.64, 625.6, 137/625.67–625.69, 625.63, 625.66, 137/596.15, 596.16, 596.18, 624.17; 91/365, 387, 47, 48, 51; 251/30.01, 251/30.02, 30.05
See application file for complete search history.

(56) References Cited

U.S. PATENT DOCUMENTS

| | | | | |
|---|---|---|---|---|
| 2,732,860 A | * | 1/1956 | Ray | 137/625.64 |
| 3,386,339 A | * | 6/1968 | Selsam | 137/625.6 |
| 4,046,165 A | * | 9/1977 | Rose et al. | 137/625.64 |
| 4,067,357 A | * | 1/1978 | Ruchser | 137/596.16 |
| 5,144,983 A | | 9/1992 | Schwelm | |

FOREIGN PATENT DOCUMENTS

| | | |
|---|---|---|
| DE | 29 32 810 A1 | 2/1981 |
| DE | 31 19 445 A1 | 2/1982 |

(Continued)

OTHER PUBLICATIONS

Machine translation of DE102006049012 taken from Espacenet website, Aug. 22, 2014.*

*Primary Examiner* — Craig Schneider
*Assistant Examiner* — Craig J Price
(74) *Attorney, Agent, or Firm* — Roylance, Abrams, Berdo and Goodman LLP

(57) ABSTRACT

A valve device includes a valve housing (2) and a valve piston (4) axially displaceably in a housing bore (3). By valve piston movement, load connections (A, B) can alternately be connected to a pressure connection (P) and to a tank connection (T1, T2) by solenoid magnets (5, 6). Pilot control chambers (8, 10) pressurize piston back sides (9, 11). The control chambers (8, 10) are connectable via fluid-conducting connections (12, 13) to the pressure connection (P). Pilot control pistons (14, 15) release or close fluid-conducting connections (16, 17) between control chambers (8, 10) and the tank connection (T1, T2). One pilot control piston (14, 15) includes a ring channel (19) controlling a fluid-conducting connection (16, 17) between a pilot control chamber (8, 10) and a tank connection (T1, T2).

23 Claims, 4 Drawing Sheets

(56) References Cited

FOREIGN PATENT DOCUMENTS

| DE | 43 19 162 A1 | 12/1994 |
| DE | 102 24 732 A1 | 10/2003 |
| DE | 600 16 510 T2 | 12/2005 |
| DE | 10 2006 049 012 A1 | 4/2008 |
| WO | WO 03/034171 A1 | 4/2003 |

\* cited by examiner

VALVE DEVICE

FIELD OF THE INVENTION

The invention relates to a valve device comprising a valve housing and a valve piston arranged to be able to move axially in a piston bore of the valve housing. Via valve piston movement, a first load connection and a second load connection can be alternately connected to a pressure connection and to a tank connection. The valve piston can be moved out of a centered, middle rest position for connecting the first load connection to the pressure connection and the second load connection to the tank connection in a first direction. For the reversed fluid-conducting connections, the valve piston can be moved in an opposite direction. A pilot control unit has a first pilot chamber that pressurizes a first piston back side of the valve piston, and has a second pilot chamber that pressurizes a second piston back side of the valve piston. The first and second pilot chambers each have one fluid-conducting connection that can be connected to the pressure connection. A first pilot piston and a second pilot piston clear or block one fluid-conducting connection at a time between the pilot chambers and the tank connection. The pilot control unit is made in the manner of a spool valve.

BACKGROUND OF THE INVENTION

Valve devices are available in a plurality of embodiments, for example, as multiport valves. In conjunction with an electromagnetic actuation, they are an important component of proportional valve technology. This technology is essentially characterized in that an electrical input signal as voltage is converted into an electrical current with an electronic amplifier of the corresponding voltage level. A proportional solenoid as a switching magnet generates the output quantities force or path proportionally to this electrical current.

These quantities are used as the input signal for the valve device or the hydraulic valve and, correspondingly proportional thereto, for a specific volumetric flow or a specific pressure. For the respective actuated load and a working element that has been actuated with it on a machine, in addition to influencing the direction of movement, the possibility of continuously influencing the speed and force occurs. At the same time, according to a corresponding time characteristic, for example, change of the volumetric flow over time, acceleration or deceleration can be continuously influenced. Depending on the function that is being emphasized, that is, the path function, the flow function, and/or the pressure function, proportional hydraulics is used in directional valves, flow control valves, or so-called pressure valves.

The technical advantages of the proportional valve technology include controlled actuation transitions, continuous control of the setpoints, and the reduction of the hydraulic apparatus for certain control tasks. Furthermore, with proportional valves, prompt and exact sequences of motion are possible with simultaneously improved accuracy of the control processes.

The known valve device solutions still leave something to be desired in the field of proportional valve technology for some control tasks, such as in double-acting hydraulic working cylinders in which the triggering takes place for positioning tasks while avoiding mechanical coupling elements, especially with respect to the operational reliability of the overall system as well as prompt response behavior.

DE 43 19 162 A1 discloses a valve device with two opposing solenoids connected to a valve housing, with fluid connection sites mounted in the valve housing in the form of at least one pump connection P, at least two load or user connections A, B, and at least two tank connections T1 and T2. A valve piston has radial projections that can each be assigned to one fluid connection site A, B, P, T1, T2 at a time in the valve housing. Fluid-conducting paths are between the projections. In a piston neutral position, the path to the respectively assignable user connection A, B is blocked in part or in full, or with the user connections A, B cleared and the respective pump connection P completely blocked by the assignable projection. The known solution relates to a hydraulic valve that can be used for controlling a hydraulic actuator in a roll stabilization system of a motor vehicle. In the known solution, however, possible disturbance variables may adversely affect the hydraulic valve system.

DE 31 19 445 A1 discloses an electrohydraulic control valve with a main housing as a valve housing that surrounds an axial bore in which a valve element as valve piston can be moved. The ends of the valve piston are of a magnetizable material. Solenoid devices are assigned to the housing part as the actuating apparatus on the outer ends of the axial bore to pull the valve element in the direction of one end of the axial bore or the other by excitation of one solenoid device or the other. For compensation of disturbance variables, this known solution has pressure detecting pistons that extend through the valve piston on its two ends. In spite of the possibility of influencing the disturbance variables via the respective pressure detecting piston, this known solution leaves much to be desired with respect to complete compensation for such disturbances.

DE 600 16 510 T2 describes a piloted directional valve with position determination, with a housing that has a number of connections and a piston bore in which each connection discharges. A valve piston is guided to be able to move axially in the piston bore to change the flow paths between the connections. To some extent complex controls for control the valve piston, with the control comprising a piston on each side of the valve piston and one or two pilot valves for setting the valve piston by control of the pilot fluid acting on the pistons. A magnet is attached to one side of the valve piston such that it can be moved in synchronous operation with the valve piston. The magnet is arranged such that it borders at least one site of the valve piston. A magnetic sensor is installed such that it detects the magnetic force of the magnet over the entire displacement path of the valve piston.

The known partially generic valve devices require path sensors and analysis and control electronics. They are thus overall complex in structure, and disturbances in operation are possible.

DE 102 24 739 A1 discloses a valve device of the initially described type. In the known valve device, the pilot valve and the pilot chamber are each located in a control cover located on a side surface of the valve housing. The object of providing a valve control apparatus that requires little installation space in the longitudinal direction of the control valve is achieved here in that the pilot valve and/or the actuator are arranged perpendicular to the longitudinal axis of the control valve in the control cover. The actuator is located on a side surface of the control cover in this case. An adjusting device of the control valve can be on an opposite side surface of the control cover.

SUMMARY OF THE INVENTION

An object of the invention is to provide an improved valve device that is mechanically simple in structure and enables reliable operation even under adverse operating conditions.

This object is basically achieved with a valve device having at least one, preferably each, pilot piston with a ring channel on its outer periphery. The ring channel enables a connection of a pilot chamber-side supply channel of pilot oil to a channel for discharging pilot oil to the respective tank connection of each pilot valve. When the pilot control unit is opened such that pressure medium or pilot oil travels from the pilot chamber via the ring channel to a tank connection, a pressure drop occurs on the back of the valve piston, and the valve piston is moved in the opposite direction since the other pilot chamber remains at the pump pressure level so that the valve piston is moved in the direction of the respective electromagnet by the pressure imbalance which is being established in the pilot chambers.

From the respective pilot chambers, fluid-conducting connections advantageously, in the form of narrow longitudinal channels with one branch duct each kept short in length lead to the ring channel located on the respective outer peripheral surface of each pilot piston. Coming from the pilot chambers to the fluid-conducting connections, each tank connection preferably includes other branch ducts and longitudinal channels that are diametrically opposite the shorter branch ducts in the valve housing and that lead to the respective tank connection in the valve housing. The magnetic force of the respective electromagnet moves the pilot piston such that the ring channel on its outer peripheral surface covers the two branch ducts. With this valve arrangement, a piloted directional valve is implemented that enables the indicated fluid-conducting connections at very low pilot pressure.

When the electromagnet assigned to the first pilot piston is actuated, the pertinent pilot piston opens the fluid-conducting connection between the first pilot chamber and the tank connection. Pressure medium from the first pilot chamber can escape into a pressure medium tank. As a result, the valve piston is moved by the force of the system pressure of the pressure connection into the second pilot chamber in the direction of the first pilot piston that is moving toward the valve piston, and a corresponding load connection is joined to the pressure connection. Another load connection is joined to the tank connection. The pilot piston is made in the manner of a sliding piston so that each pilot valve is designed as a valve, preferably without a gasket. Obstructive friction in operation is thus minimized and ensures that the respective pilot valve can perform its throttling function undisturbed.

A possible deleterious effect on the valve piston by forces of friction or flow can be compensated without control effort by an intensified outflow of the pressure medium from the first pilot chamber. As a result of that intensified outflow, the valve piston continues to move in the direction of the desired position. When the electrical current for the first electromagnet is lowered or turned off, the pilot piston moves, preferably in addition caused by an energy storage mechanism, in the direction of a blocking position of the fluid-conducting connection between the first pilot chamber and the tank connection. The pressure that builds up again in the first pilot chamber moves the valve piston again in the direction of its rest position.

The valve piston can also be axially displaced in the same described manner into the opposite direction when the second electromagnet is energized. In this way, the second load connection can be connected to the pressure connection and the first load connection to the tank connection. Continuously a fluid-conducting connection is between the pressure connection and the first and second pilot chamber. The pressure medium in the pilot chambers can act directly on the respective back side of the valve piston.

In one preferred embodiment of the valve device according to the invention, the respective pilot chambers are connected to conduct fluid to branch ducts that, penetrating the valve housing in the radial direction, are connected to a common pressure connection bore. In the axial direction of the valve housing, the common pressure connection bore extends preferably to two free face sides of the valve housing. Especially preferably, the branch ducts and the pressure connection bore tbrm first and second fluid-conducting connections for the two pilot chambers and can be charged with the control or pump connection pressure. An internal pressure balance between the two pilot chambers is thus attained as well as delivery of the desired pressure, which can be easily implemented.

In one preferred embodiment of the valve device according to the invention, one compression spring at a time is provided between the valve piston and each pilot piston, with the stroke of the valve piston being proportional to the magnet current of the magnet apparatus with the pilot control unit open. The compression spring acting on the valve piston signals the position of the valve piston back to the respective pilot piston so that possible disruptive variables, for example, caused by flow forces, can be immediately corrected. The position of the valve piston is moreover directly correlated to the applied magnet current. On the free end of the compression spring facing the assigned pilot piston, a stop piece is connected to the free end of the respective pilot piston in turn via a stop ball.

The stop ball allows unobstructed operation when the pilot piston and valve piston are interacting.

In one especially preferred exemplary embodiment of the valve device, the assigned electromagnet acts on the respective pilot piston with thrust in the direction of the valve piston as soon as the electromagnet is energized. As a result, the fluid-conducting connection from the respective pilot chamber via the ring channel on the respective pilot piston is opened to the respective tank connection.

One further compression spring at a time is supported on the one hand on a valve housing shoulder and on the other hand on a radial widening of the pilot piston to thereby bring the pilot piston with its radial widening into contact with a stop flange of the valve housing. In the unenergized state of each electromagnet, the pilot piston is in a closed position and, accordingly, its ring channel is between the respective pilot chamber and the tank connection. The connecting channels that constitute the fluid-conducting connection between the respective pilot chambers and the respective tank connection via the respective ring channel on the pilot pistons are formed in the valve housing as longitudinal channels and branch ducts extending transversely thereto.

The valve piston is held in a neutral position by an energy storage mechanism acting with the same pressure force in addition to the same pressure force of the pressure medium in the pilot chambers on both back sides of the piston. The two energy storage mechanisms can be compression springs. In order not to tap the supply pressure directly from the pressure connection, advantageously the pressure connection and thus the fluid-conducting connections from the pressure connection are connected to the pilot chambers at the same time by one load connection representing the load side of the load via a shuttle valve. This structure permits operation of the valve arrangements with the pressure medium pump turned off, solely by the load pressure on the consumer. When the pressure medium pump is turned on again, the shuttle valve blocks, and the pressure on the pressure connection is transferred directly from the pump to the two pilot chambers.

To route the available pressure that is the highest at the time either from the pressure connection or the two load connections in the load circuit to the pilot chambers as a pilot pressure, all three pertinent connections, specifically the pressure connection, first load connection, and second load connection, can be connected via one nonreturn valve at a time to a collecting line to the fluid-conducting connection to the pilot chambers.

To center the valve piston in its neutral middle rest position in the piston bore and to return the valve piston when it is deflected, in addition one energy storage mechanism at a time or especially one compression spring can be inserted into each pilot chamber.

A symmetrical embodiment of the valve device, which is therefore easy to fabricate, is produced by selecting a middle position of the pressure connection of the pressure medium pump with reference to the longitudinal axis of the valve housing. To both sides of the pressure connection, the first and second load connections and first and second tank connections are connected to the pressure connection with respectively preferably the same distance. A pressure connection for pressurizing the pilot chambers can be separately provided on the valve housing and can branch to the two pilot chambers.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
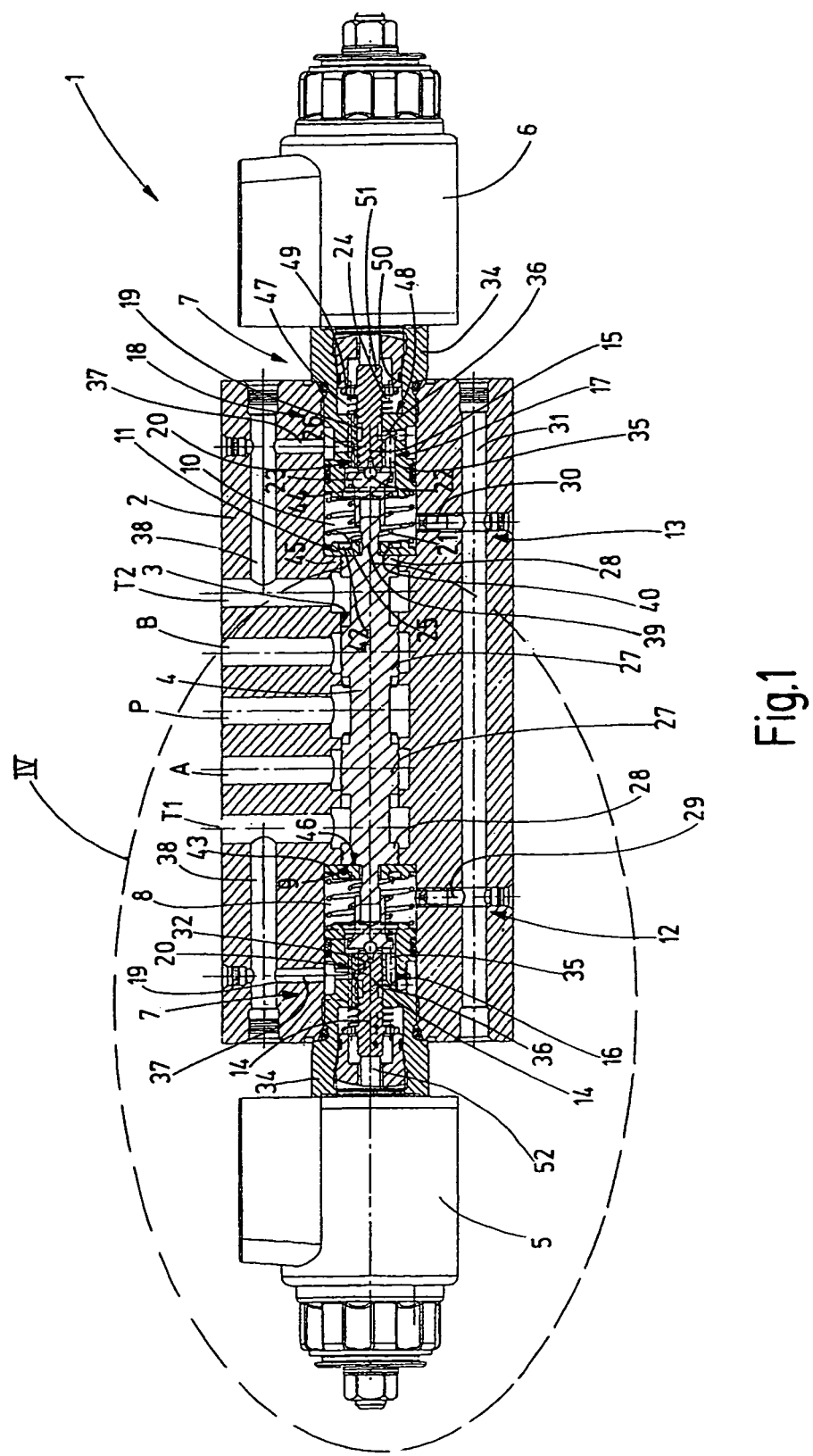
FIG. 1 is a side elevational view in section of a valve device according to a first exemplary embodiment of the invention.
Figure 4:
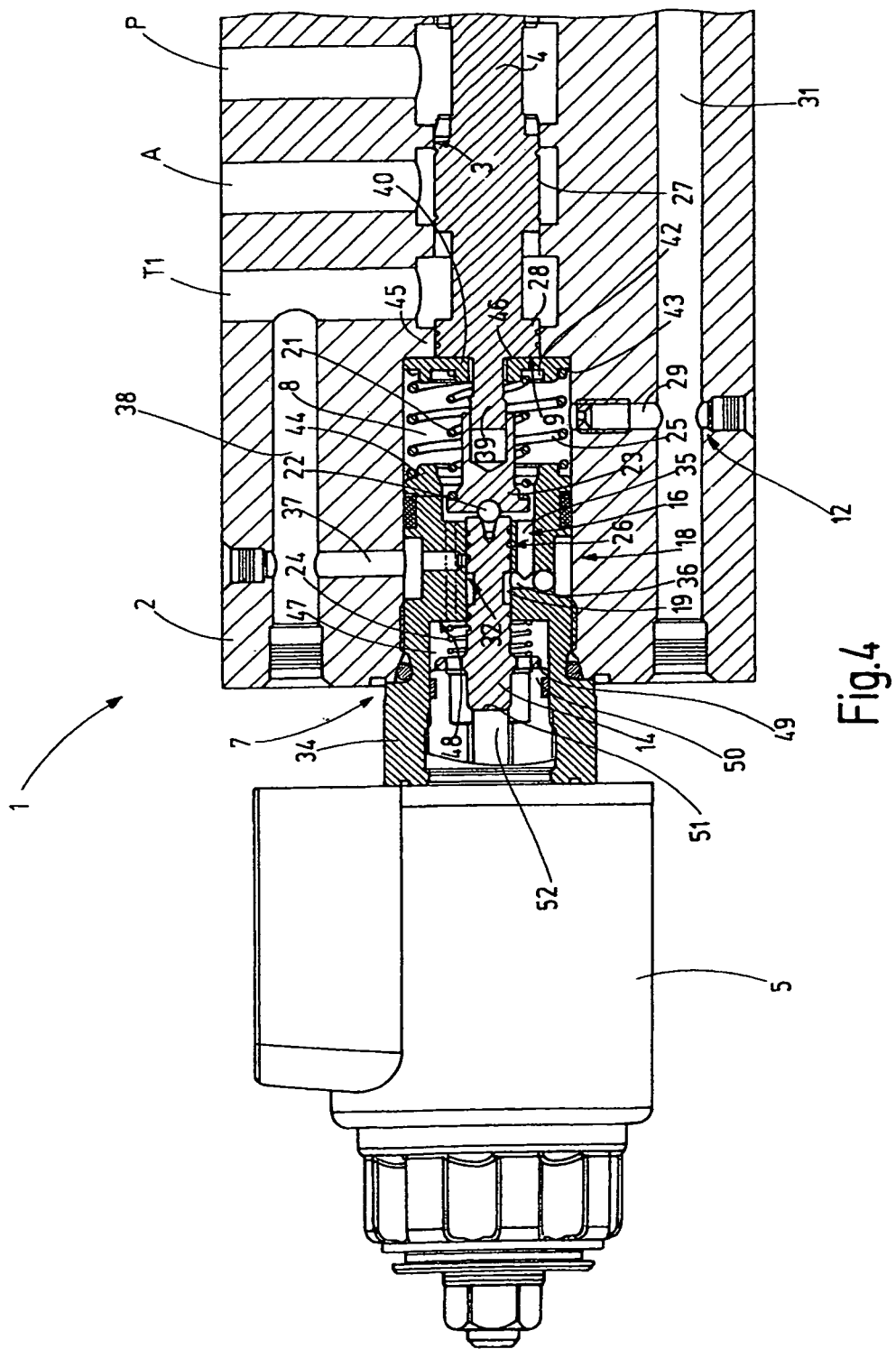
FIG. 4 is an enlarged and partial side elevational view in section of the detail of the valve device circumscribed in FIG. 1 and marked with the numeral IV.

FIG. 1 and, according to the detail in FIG. 4, in a schematic longitudinal section, that is not to scale, shows a valve device 1 for controlling pressure media, such as hydraulic oil, to a load that is not detailed. The valve device 1 has a valve housing 2 made essentially cylindrical. A through bore designed as piston bore 3 or guide cylinder for a valve piston 4 is made in the valve housing 2 for this purpose. For indirect actuation of the valve piston 4, on both sides of the valve housing 2, first and second electromagnets 5, 6 are mounted in one centering bore at a time in the valve housing 2 in a manner that is not shown. The electromagnets 5, 6 are designed as proportional solenoids. In the valve housing 2, fluid connection sites are made in the form of at least one pump connection or pressure connection P, two load connections A, B, and two tank connections T1, T2. The valve piston 4 is guided to be able to move lengthwise in the valve housing 2 and has projections 27, 28 that extend radially on the outer peripheral side of the valve piston. The respective radial outer periphery of the projections are chosen such that they can slide sealingly on the inner peripheral side of the piston bore 3.

In the exemplary embodiments of FIGS. 1 to 4, the two middle projections 27 are assigned to the load connections A, B, and the two projections 28, located axially on the ends of the valve piston 4 are assigned to the tank connections T1 and T2. Between the projections 27, 28, the valve piston 4 is reduced in diameter so that fluid-conducting paths are formed between the inner periphery of the valve housing 2 and the respectively reduced outside diameter of the valve piston 4.

On each of its two opposite sides, the valve housing 2 has one first pilot control unit 7 at a time with a first pilot chamber 8 and a second pilot chamber 10 whose respective volume can be changed by the movable valve piston 4. The respective pilot chambers 8, 10 are connected to conduct fluid to the branch ducts 29, 30 that extend through the valve housing 2 in the radial direction and are connected to a common pressure connection bore 31 extending in the axial direction through the valve housing 2 to the housing two free axial face sides. The branch ducts 29, and the pressure connection bore 31 form first and second fluid-conducting connections 12, 13 for the two pilot chambers 8, 9 and are supplied with the control or pump connection pressure P.

The pilot control unit 7 itself is made in the manner of a spool valve 18 in which first and second pilot pistons 14, 15 are guided to be able to move longitudinally in the valve housing 2 in a corresponding longitudinal bore 32 that is circular in cross section and that has a smaller diameter than the longitudinal bore 3 for the valve piston 4. Each pilot piston 14, 15 is surrounded on the outer peripheral side by pressure relief grooves that at least partially ensure the absence of leaks in this axial region for the pilot pistons 14, 15 and hence form a type of sealing system 26. Otherwise, the pressure relief grooves shorten the effective gap length of the sealing gap and therefore reduce the tendency to sticking.

Viewed in the longitudinal direction of the valve arrangement 1, each pilot chamber 8, 10 is located between one piston back side 9, 11 at a time of the valve piston 4 and a valve insert 34 that holds the electromagnets 5, 6. Each pilot chamber is connected to the respective end of the valve piston 4. From the respective pilot chambers 8, 10, other fluid-conducting connections 16, 17, first in the form of narrow longitudinal channels 35 with one radial branch duct 36 at a time, which radial branch duct 36 is kept very short in length, lead to a ring channel 19 located on the respective outer peripheral surface 20 of each pilot piston 14, 15.

Coming from the pilot chambers 8, 10 to the fluid-conducting connections 16, 17, one tank connection T1, T2 at a time includes other branch ducts 37 and longitudinal channels 38 that are diametrically opposite the shorter branch ducts 36 in the valve housing 2 and that lead to the respective tank connection T1, T2 in the valve housing 2.

The valve piston 4 is in its closed operating position in FIGS. 1 to 4.

The valve piston 4 has a pin-like extension 39 that is smaller in diameter than its other diameter. The extension 39, formed on both ends of the valve piston 4 integrally with the valve piston 4, projects axially as far as approximately to the middle of the respective pilot chambers 8, 10. Each extension 39 projects through a stop disk 40 of a respective stop piece 23. The respective stop piece 23 on its end facing away from the respective extension 39 has a disk-like widening that bears one stop ball 22 at a time in a corresponding recess. The free end of each pilot piston 14, 15 is supported in this case on the stop ball 22. In this way, unobstructed operation and triggering between pilot pistons 14, 15 and the valve piston 4 are achieved even in the event that sticking processes were to occur that can then be compensated by the stop ball 22. Hydrodynamic damping can be implemented via the extension 39 in conjunction with the respective stop piece 23. If damping should not be required for the application, the component 23 is made simply as a spring cup. This sleeve is then made shorter in order not to place it over the piston.

One compression spring 21 at a time is between the valve piston 4 and each stop piece 23. The helical cylinder-shaped compression spring 21 is supported on the one hand or axial end in a first end-side annular groove 42 of each stop disk 40. On the other hand or axial end, the respective compression spring 21 is supported on the respective disk-shaped end of the stop piece 23. The compression spring 21 has a smaller diameter than one other compression spring 25 supported on the stop disk 40 and on the respective valve insert 34. The compression spring 25 is centered in an annular groove 43 in the stop disk 40 and in an annular groove 44 located on the free end of the valve insert 34. Spring 25 radially surrounds the respective compression spring 21. The compression spring 25 presses the stop disk 40 against a narrowing of the diameter 45 of the pilot chamber 8, 10 and against the respective end surface 46 out of which the extension 39 projects. This arrangement results in a precisely reproducible neutral position for the valve piston 4.

One other third compression spring 24 at a time moves the respective pilot position 14, 15 into a "closed position." For this purpose, an annular space 47 is in the valve insert 34. The respective compression spring 24 is supported on a bottom 48 of the respective annular space 47 and on a radial widening 49 of the respective pilot piston 14, 15. In this way, the respective compression spring 24 presses the radial widening 49 against a respective stop collar 50 of a screw base via which the respective electromagnet 4, 5 is screwed into the respective valve insert 34. The free end 51 of the respective pilot piston 14, 15 is in contact with one free end of an actuating plunger 52 of each electromagnet 5, 6.

For the sake of better understanding, the operation of the exemplary embodiment of a valve arrangement according to the invention as shown in FIG. 1 is detailed with respect to the pilot control unit.

When the electromagnet 5 is energized, a magnet armature (not detailed), migrates under the action of the field of a coil winding (not shown), to extend the actuating plunger 52 out of the pole tube of the magnet apparatus to the right as seen in the direction of FIG. 1. As a result, the pilot piston 14 experiences a thrust opposite the action of the compression spring 24 and of the compression spring 21 tending, with their reset forces, to keep the radial widening 49 in contact with the stop collar 50. That magnetic force is sufficient to move the pilot piston 14 opposite the action of the compression springs 21, 24 such that the ring channel 19 on its outer peripheral surface 20 covers the branch duct 36 and the branch duct 37. The pilot control unit 7 is thus opened such that the pressure medium or pilot oil travels from the pilot chamber 8 via the longitudinal channel 38 to the tank connection T1. At the same time, the pressure on the back side 9 of the valve piston 4 drops, and the valve piston 4 is moved against the action of the compression spring 21 to the left, viewed in the direction of FIG. 1. Since the second pilot chamber 10 remains at the pump pressure level P, the valve piston 4 is moved in the direction of the first electromagnet 5 in the pilot chambers 8, 10 by the pressure imbalance being established. The longitudinal bore shown by the broken line in the figures in the valve insert 34 establishes the pressure equalization between the pilot chamber and pole tube so that the pilot piston 14 is in an equilibrium of forces.

This piston stroke of the valve piston 4 is proportional to the magnetic force of the electromagnet 5. The compression spring 21 signals the position of the valve piston 4 back to the pilot piston 4 so that disruptive variables, such as, for example, flow forces, can be corrected in this way. Also, the position of the valve piston 4 then always corresponds to the magnetic force of the electromagnet 5 in the energized state.

When power to the first electromagnet is reduced or cut off, the valve piston 4 returns to its initial position under the action of the compression springs 21 and 25. The same sequence in the reverse direction takes place when the second electromagnet 6 is energized. The load connection B becomes connected to the tank connection T2 to conduct fluid, and the load connection A becomes connected to the pressure connection P to conduct fluid.

With this valve arrangement 1, a pilot-actuated directional valve is therefore implemented that, at very low pilot pressure, already enables the indicated fluid-conducting connections. The compression spring 21 is not critically necessary. It does, however, improve the return of the pilot piston 14, 15 and thus overall the dynamics for the valve arrangement 1. In particular, the compression spring 21 is used for feedback of the piston position as a force back to the magnet system. The implemented pilot control unit 7 is made in the manner of a spool valve. That manner is the best solution to the uniform actuating behavior under different operating conditions and pressure characteristics.

Figure 2:
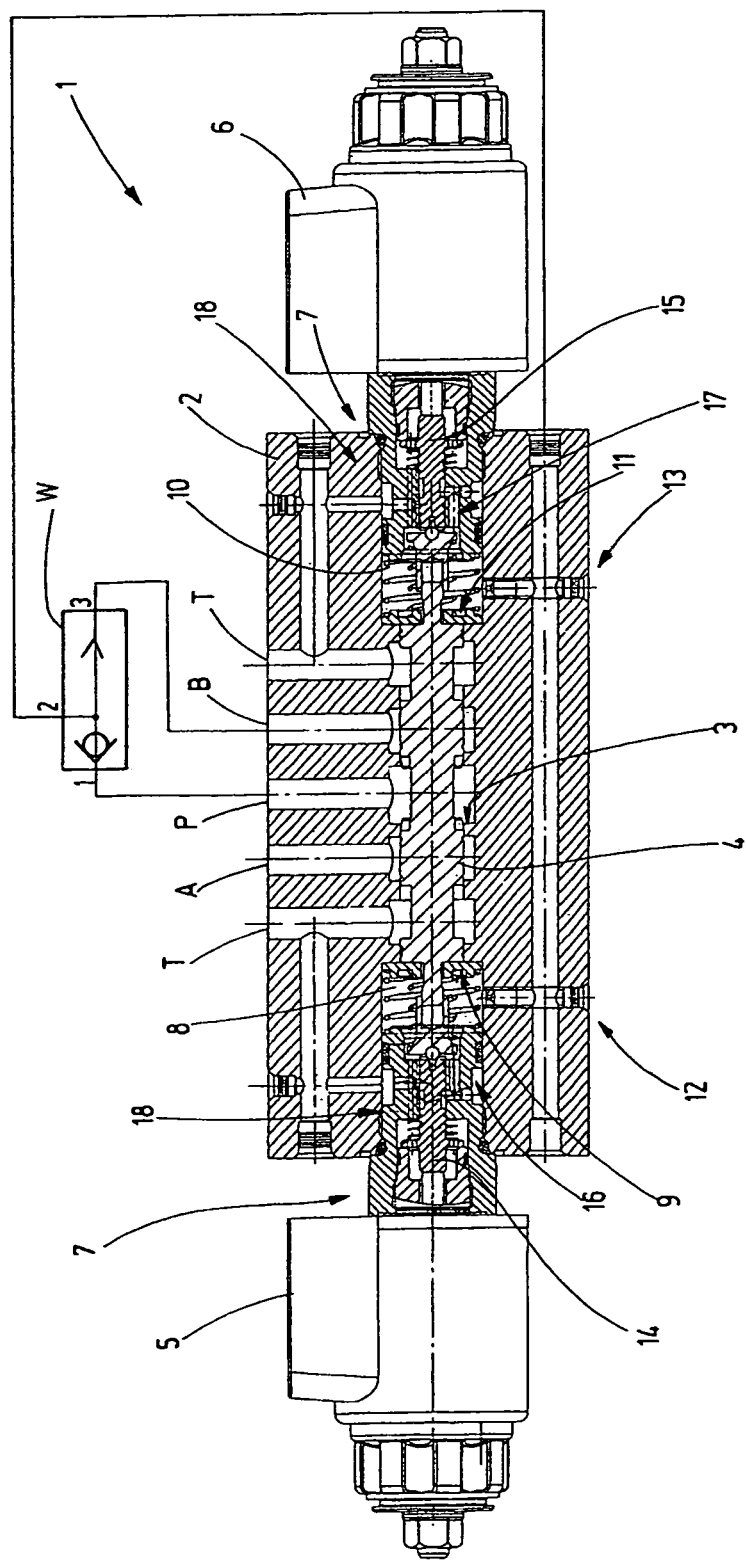
FIG. 2 is a side elevational view in section of a valve device according to a second exemplary embodiment of the invention.

As FIG. 2 in particular shows, the supply pressure for the two pilot chambers 8, 10 can be tapped not only from the pressure connection P, but also via a coupling of the load connections A, B and of the pressure connection P with interposition of a shuttle valve W either directly from the pressure connection P or one of the load connections A, B, before the pressure medium is supplied to the pilot chambers 8, 10. This design measure allows the valve device to be operated even with the pressure medium pump turned off.

Figure 3:
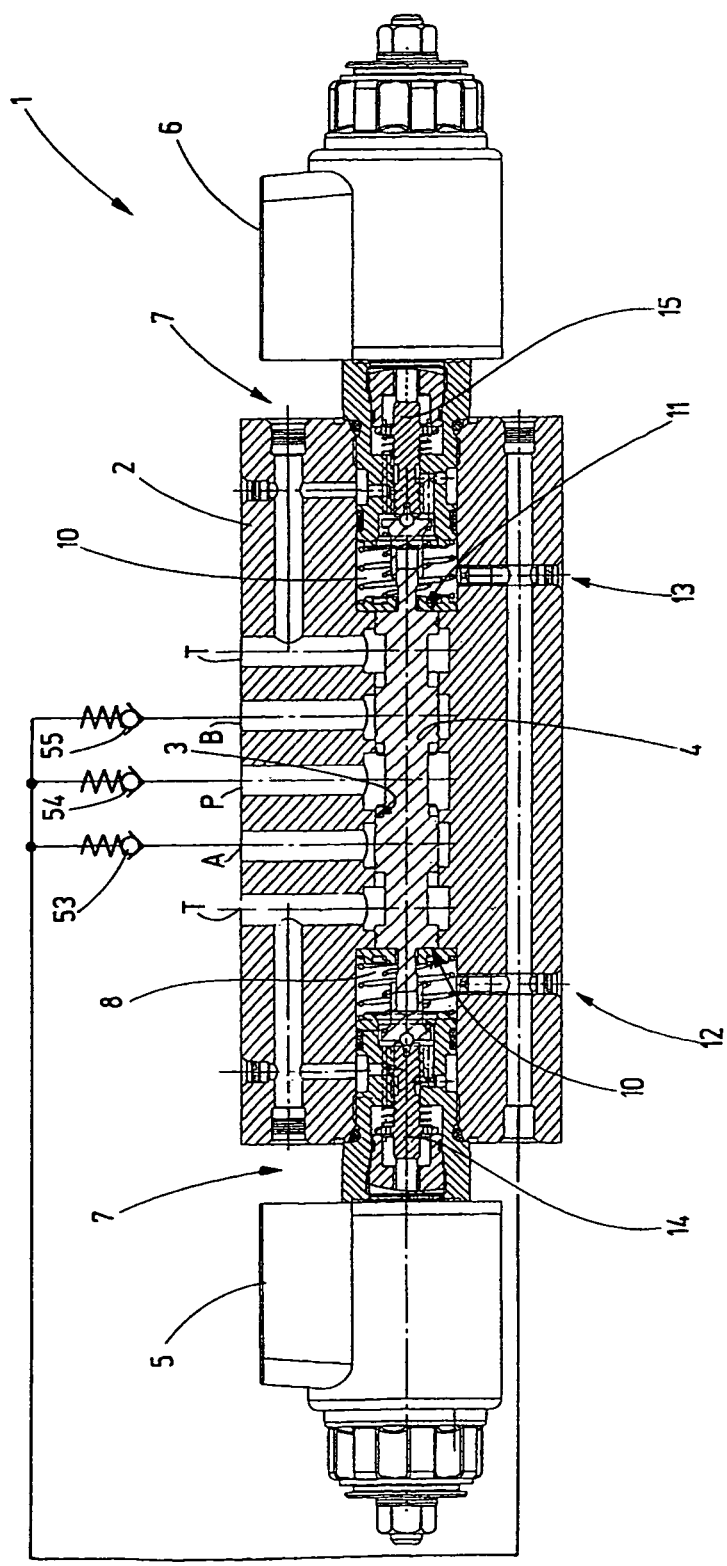
FIG. 3 is a side elevational view in section of a valve device according to a third exemplary embodiment of the invention.

As shown by FIG. 3 in particular, advantageously, tapping the highest available pressure medium pressure by a parallel connection of the indicated connections P, A, B via one non-return valve 53, 54, 55, respectively, that opens in the direction of the pilot chambers 8, 10 between the connections.

The valve device 1 piloted in this way does not require any path sensors for the valve piston 4, nor are further analysis and control electronics critically necessary. The valve device 1 thus has a simple structure and low susceptibility to faults based on its mechanical design. When the current supply to the electromagnets 5, 6 is cut off, for example, in the case of damage, the valve piston 4 automatically returns to its spring-centered, blocking middle position.

While various embodiments have been chosen to illustrate the invention, it will be understood by those skilled in the art that various changes and modifications can be made therein without departing from the scope of the invention as defined in the appended claims.

What is claimed is:

1. A valve device, comprising:
   a valve housing having a piston bore, a first load connection, a second load connection, a pressure connection and first and second tank connections therein;
   first and second electromagnets coupled at opposite axial ends of said valve housing;
   a valve piston axially movable in said piston bore from a centered middle rest position to a first position connecting said first load connection to said pressure connection and said second load connection to said second tank connection in a first direction and to a second position connecting said second load connection to said pressure connection and said first load connection to said first tank connection in a second direction opposite to said first direction;
   a pilot control unit having a first pilot chamber pressurizing a first piston back side of said valve piston and having a second pilot chamber pressurizing a second piston back side of said valve piston, said pilot control unit being a spool valve, said first and second pilot chambers having first and second fluid-conducting connections connectable to said first and second tank connections, respectively, said first and second fluid-conducting connections being narrow longitudinal channels from the respective pilot chamber with first and second radial branch ducts, respectively, that are short in length:

first and second pilot pistons coupled to and clearing and blocking said first and second fluid-conducting connections between said first and second pilot chambers and said first and second tank connections, respectively;

first and second ring channels on outer peripheral surfaces of said first and second pilot pistons controlling said first and second fluid-conducting connections between said first and second pilot chambers and said first and second tank connections, respectively, said first and second radial branch ducts leading to said first and second ring channels, respectively; and third and fourth branch ducts and third and fourth longitudinal channels being opposite said first and second branch ducts in said valve housing leading to said first and second tank connections and being downstream of said first and second pilot chambers and said first and second fluid-conducting connections, respectively.

2. A valve device according to claim 1 wherein
said first and second pilot chambers are connected in fluid communication to first and second radial branch ducts, respectively, extending in a radial direction in said valve housing and connected to a common pressure bore, said common pressure bore extending in an axial direction of and in said valve housing.

3. A valve device according to claim 2 wherein
said common pressure bore extends in said valve housing to axial free end face sides of said valve housing.

4. A valve device according to claim 2 wherein
said first and second radial branch ducts and said common pressure bore form first and second pressure fluid-conducting connections from said first and second pilot chambers, respectively, to said pressure connection.

5. A valve device according to claim 1 wherein
first and second compression springs are between said valve piston and said first and second pilot pistons, respectively, said valve piston having a piston stroke proportional to magnet currents of said first and second electromagnets when said pilot control unit is open.

6. A valve device according to claim 1 wherein
first and second stop balls connect free ends of said first and second pilot pistons to first and second stop pieces of said valve piston, respectively.

7. A valve device according to claim 6 wherein
each said stop piece adjoins said valve piston with interposition of a compression spring.

8. A valve device according to claim 1 wherein
said first and second electromagnets apply thrust forces to said first and second pilot pistons to open said first and second fluid-conducting connections from said first and second pilot chambers to said first and second tank connections, respectively.

9. A valve device according to claim 1 wherein
first and second compression springs bias said first and second pilot pistons, respectively, into a closed position of said pilot control unit.

10. A valve device according to claim 1 wherein
first and second compression springs on opposite axial ends of said valve piston bias said valve piston to the centered middle rest position.

11. A valve device according to claim 1 wherein
said first and second fluid-conducting connections are fluidly located between said first and second pilot chambers and said first and second tank connections, respectively, in said housing.

12. A valve device according to claim 1 wherein
said first and second pilot chambers are selectively connectable to one of said load connections and said pressure connection with interposition of a shuttle valve.

13. A valve device, comprising:
a valve housing having a piston bore, a first load connection, a second load connection, a pressure connection and first and second tank connections therein;

first and second electromagnets coupled at opposite axial ends of said valve housing;

a valve piston axially movable in said piston bore from a centered middle rest position to a first position connecting said first load connection to said pressure connection and said second load connection to said second tank connection in a first direction and to a second position connecting said second load connection to said pressure connection and said first load connection to said first tank connection in a second direction opposite to said first direction;

a pilot control unit having a first pilot chamber pressurizing a first piston back side of said valve piston and having a second pilot chamber pressurizing a second piston back side of said valve piston, said pilot control unit being a spool valve, said first and second pilot chambers having first and second fluid-conducting connections connectable to said first and second tank connections, respectively, said first and second fluid-conducting connections being narrow longitudinal channels from the respective pilot chamber with first and second radial branch ducts, respectively, that is short in length;

first and second pilot pistons coupled to and clearing and blocking said first and second fluid-conducting connections between said first and second pilot chambers and said first and second tank connections, respectively;

a first ring channel on an outer peripheral surface of at least one of said first pilot pistons controlling said first fluid-conducting connection between said first pilot chamber and said first tank connection; and first and second stop balls connecting free ends of said first and second pilot pistons to first and second stop pieces of said valve piston, respectively.

14. A valve device according to claim 13 wherein
said first and second pilot chambers are connected in fluid communication to first and second radial branch ducts, respectively, extending in a radial direction in said valve housing and connected to a common pressure bore, said common pressure bore extending in an axial direction of and in said valve housing.

15. A valve device according to claim 14 wherein
said common pressure bore extends in said valve housing to axial free end face sides of said valve housing.

16. A valve device according to claim 14 wherein
said first and second radial branch ducts and said common pressure bore form first and second fluid-conducting connections from said first and second pilot chambers, respectively, to said pressure connection.

17. A valve device according to claim 13 wherein first and second compression springs are between said valve piston and said first and second pilot pistons, respectively, said valve piston having a piston stroke proportional to magnet currents of said first and second electromagnets when said pilot control unit is open.

18. A valve device according to claim 13 wherein each said stop piece adjoins said valve piston with interposition of a compression spring.

19. A valve device according to claim 13 wherein said first and second electromagnets apply thrust forces to said first and second pilot pistons to open said first and second fluid-conducting connections from said first and second pilot chambers to said first and second tank connections, respectively.

20. A valve device according to claim 13 wherein first and second compression springs bias said first and second pilot pistons, respectively, into a closed position of said pilot control unit.

21. A valve device according to claim 13 wherein first and second compression springs on opposite axial ends of said valve piston bias said valve piston to the centered middle rest position.

22. A valve device according to claim 13 wherein said first and second fluid-conducting connections are located between said first and second pilot chambers and said first and second tank connections, respectively, in said housing.

23. A valve device according to claim 13 wherein said first and second pilot chambers are selectively connectable to one of said load connections and said pressure connection with interposition of a shuttle valve.

* * * * *